United States Patent
Hu

(10) Patent No.: US 9,094,981 B2
(45) Date of Patent: Jul. 28, 2015

(54) METHOD, SYSTEM AND DEVICE FOR PROCESSING RELEASE FAILURE OF PACKET DATA NETWORK

(75) Inventor: Fang Hu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 537 days.

(21) Appl. No.: 13/522,020

(22) PCT Filed: May 14, 2010

(86) PCT No.: PCT/CN2010/072771
§ 371 (c)(1),
(2), (4) Date: Jul. 13, 2012

(87) PCT Pub. No.: WO2011/116543
PCT Pub. Date: Sep. 29, 2011

(65) Prior Publication Data
US 2012/0327758 A1 Dec. 27, 2012

(30) Foreign Application Priority Data

Mar. 22, 2010 (CN) .......................... 2010 1 0138502

(51) Int. Cl.
*H04W 76/06* (2009.01)
*H04W 28/04* (2009.01)
*H04W 28/06* (2009.01)
*H04W 76/02* (2009.01)

(52) U.S. Cl.
CPC .............. *H04W 76/06* (2013.01); *H04W 28/04* (2013.01); *H04W 28/06* (2013.01); *H04W 76/028* (2013.01)

(58) Field of Classification Search
None
See application file for complete search history.

(56) References Cited

U.S. PATENT DOCUMENTS

2009/0310581 A1  12/2009  Lansisalmi
2010/0042714 A1   2/2010  Choi

FOREIGN PATENT DOCUMENTS

| CN | 101577931 A | 11/2009 |
| JP | 2011523534 A | 8/2011 |
| JP | 2012512548 A | 5/2012 |
| WO | 2009129248 A1 | 10/2009 |
| WO | 2009150155 A1 | 12/2009 |
| WO | 2010019005 A2 | 2/2010 |

OTHER PUBLICATIONS

International Search Report in international application No. PCT/CN2010/072771, mailed on Dec. 30, 2010.
English Translation of the Written Opinion of the International Search Authority in international application No. PCT/CN2010/072771, mailed on Dec. 30, 2010.

*Primary Examiner* — Huy D Vu
*Assistant Examiner* — Bao G Nguyen
(74) *Attorney, Agent, or Firm* — Oppedahl Patent Law Firm LLC

(57) ABSTRACT

The present disclosure provides a method, system and device for processing the release failure of a PDN. The method includes: a UE, when the UE determines that it currently connects with at least two PDNs, sends a PDN release request message to an EPC and then receives a release rejection message from the EPC, wherein a rejection reason is that the last PDN connection is not allowed to be released; and the UE releases each PDN connection with the EPC and then resets up a PDN connection with the EPC. Through the technical solution, the PDN connection information of the UE and that of the EPC are kept consistent, so that resources are saved and the reliability of data transmission is improved.

11 Claims, 9 Drawing Sheets

METHOD, SYSTEM AND DEVICE FOR PROCESSING RELEASE FAILURE OF PACKET DATA NETWORK

TECHNICAL FIELD

The present disclosure relates to the technical field of communications, in particular to a method, system and device for processing the release failure of a Packet Data Network (PDN).

BACKGROUND

The Long Term Evolution (LTE) system of the 3rd Generation Partnership Project (3GPP) includes: a User Equipment (UE), an E-UTRAN NodeB (eNB) and an Evolved Packet Core (EPC). FIG. 1 is a diagram showing the structure of the LTE system, wherein an air interface (Uu) is adopted between the UE and the eNB, and an S1 interface is adopted between the eNB and the EPC.

In the LTE system, when the UE sends an attach request to the EPC, the EPC sets up a default PDN connection with the UE, i.e., the EPC sets up a default bearer, and allocates an IP address to the UE. Then, due to a service requirement, when the UE sends a request for setting up a second PDN connection to the EPC and the EPC receives the request, the EPC will set up a default bearer with the UE again and allocate a new IP address to the UE. The UE distinguishes different PDNs by Linked EPS Bearer Id (LBI) information.

When the UE does not need to keep connection with a certain PDN, it will send a PDN release request message to the EPC to indicate that the EPC needs to delete the PDN connection, wherein the release request includes releasing the default bearer and releasing all private bearer resources. When determining that the PDN requested to be released is not the last PDN with the UE, the EPC deletes all resources connected to the PDN, including the default bearer and all private bearers thereof. FIG. 2 is a process that a UE requests to release a certain PDN, and the process may include:

S201: The UE sends an uplink message to the EPC via an eNB, wherein the uplink message contains a PDN disconnection request, the PDN disconnection request contains the LBI information of the PDN requested to be released.

S202: After receiving the uplink message, the EPC sends a bearer release request to the eNB, wherein the bearer release request contains context request information of releasing an EPS (Evolved Packet System) bearer; and starts a T3495 timer.

S203: After receiving the bearer release request, the eNB sends a Radio Resource Control (RRC) connection reconfiguration message to the UE, wherein the RRC connection reconfiguration message contains the context request information of releasing the EPS bearer.

S204: The UE receives the RRC connection reconfiguration message, performs connection reconfiguration, and sends an RRC connection reconfiguration completion message to the eNB after the connection reconfiguration is completed.

S205: After receiving the RRC connection reconfiguration completion message, the eNB sends a bearer release response message to the EPC.

S206: The UE sends an uplink message to the EPC via the eNB, wherein the uplink message contains the context information of releasing the EPS bearer reception.

S207: When receiving an uplink message containing the context information of releasing the EPS bearer reception within the timing range of the T3495 timer, the EPC deletes all resources of the PDN connection, including the default bearer and all private bearers thereof.

Otherwise, besides the flow of releasing the PDN connection shown in FIG. 2, the EPC will also actively initiate a PDN connection release request because of insufficient resources. For example, in an idle mode, the EPC will locally release the PDN but does not notify the UE. When switching from an idle mode to a connection mode, the EPC will synchronize bearer resources by a Service Request message or Tracking Area Updating (TAU) flow. FIG. 3 is a process that an EPC actively initiates a PDN release request in a connection state, and the process may include:

S301: The EPC sends a bearer deleting request to the eNB, wherein the bearer deleting request contains the context request information of releasing the EPS bearer, and starts the T3495 timer.

S302: After receiving the bearer deleting request, the eNB sends an RRC connection reconfiguration message to the UE, wherein the RRC connection reconfiguration message contains the context request information of releasing the EPS bearer.

S303: The UE performs connection reconfiguration and then sends the RRC connection reconfiguration completion message to the eNB after the connection reconfiguration is completed.

S304: The eNB sends a bearer release response message to the EPC.

S305: The UE sends an uplink message to the EPC via the eNB, wherein the uplink message contains the context information of releasing the EPS bearer reception.

S306: After receiving the uplink message sent by the UE and containing the context information of releasing the EPS bearer reception within the timing range of the T3495 timer, the EPC deletes all resources of the PDN connection, including the default bearer and all private bearers thereof, and stops the T3495 timer.

The process of releasing the PDN bearer initiated by the EPC in the above mentioned process may be not notified to the UE due to the network status and the like. FIG. 4 is a process that the EPC cannot notify the UE due to the network status, and the process may include:

S401: The EPC sends a bearer deleting request to the UE via the eNB, wherein the bearer deleting request contains the context request information of releasing the EPS bearer, and then starts the T3495 timer.

S402: The UE detects the bearer deleting request, and when the detection is failed, for example, the detection is failed due to a security problem of the deleting request, the UE will discard the bearer deleting request.

S403: When failing to receive the response message of the UE within the timing range of the T3495 timer, the EPC sends the bearer deleting request to the UE again via the eNB, and starts the T3495 timer.

S404: The UE detects the bearer deleting request, and when the detection is failed, for example, the detection is failed due to a security problem of the deleting request, the UE will discard the bearer deleting request.

S405: When failing to receive the response message of the UE within the timing range of the T3495 timer, the EPC sends the bearer deleting request to the UE again via the eNB, and starts the T3495 timer again.

S406: If still failing to receive the response message of the UE within the timing range of the T3495 timer after predetermined times, such as 5 times, the EPC locally deletes the PDN connection.

Under such condition, the release information of the PDN bearer is not notified to the UE, but the EPC has deleted the PDN connection, so that the PDN information stored by the EPC and that stored by the UE are not consistent. In addition, when the EPC stores one PDN connection which is set up between the EPC and the UE, for example, a first PDN connection, and the UE has set up at least two PDN connections with the EPC, if the UE needs to delete the first PDN connection, the UE sends a request message of releasing the first PDN to the EPC via the eNB; after the EPC receives the request message of releasing the first PDN, it determines that only the first PDN connection is existed between the EPC and the UE, and will reply a PDN release rejection message to the UE, wherein the rejection message contains a rejection reason: the last PDN connection is not allowed to be released, i.e., the PDN connection is the only connection between the UE and the EPC and therefore not allowed to be released.

In the related art, the UE will discard the PDN release process after receiving the rejection message. Since the UE cannot delete the PDN, when the UE sends data by the PDN which has been deleted at the EPC side, data cannot be sent to a corresponding end, so that reliability of data transmission is affected. Besides, the UE and the eNB do not release the corresponding PDN, therefore the PDN resources cannot be used by other UEs, so as to cause the waste of corresponding PDN resources.

SUMMARY

In view of this, embodiments of the present disclosure provide a method, system and device for processing the release failure of a Packet Data Network (PDN), which can ensure the consistence of PDN information stored by an EPC and a UE, so as to save resources and improve reliability of data transmission.

The method for processing release failure of the PDN includes: a UE, when determining that it currently connects with at least two PDNs, sends a PDN release request message to an EPC;

the UE receives a PDN release rejection message sent by the EPC, and sends a disconnection request to the EPC when a rejection reason contained in the rejection message is that the last PDN connection is not allowed to be released; and the UE, after receiving a disconnection acceptance message sent by the EPC, sends an attach request message to the EPC to set up a PDN connection with the EPC.

The step that the EPC sends the PDN release rejection message may include:

the EPC receives the PDN release request message, and sends the PDN release rejection message to the UE when determining that a PDN connection requested to be released contained in the PDN release request message is the only PDN connection set up between the EPC and the UE according to Linked EPS Bearer Id (LBO information of the PDN connection requested to be released contained in the PDN release request message and PDN connection information between the EPC and the UE stored by the EPC.

After the EPC sends the disconnection acceptance message, the method may further include:

the EPC sends an S1 interface release message to an eNB to notify the eNB to release the S1 interface between the eNB and the EPC; and the eNB receives the S1 interface release message and then sends an air interface release message to the UE to notify the UE to release the air interface between the UE and the eNB.

Setting-up the PDN connection with the EPC may include:

the UE sends an uplink message to the EPC via the eNB, wherein the uplink message contains a PDN connection set-up request;

the EPC, after receiving the uplink message, sends a bearer set-up request to the eNB, wherein the bearer set-up request contains the context request information for setting up a default EPS bearer;

the eNB receives the bearer set-up request and sends an RRC connection reconfiguration message to the UE; and the UE performs connection reconfiguration, and sends the context information of the default EPS bearer reception to the EPC via the eNB to set up the PDN connection with the EPC.

A system for processing the release failure of the PDN includes:

a UE which is used for sending a PDN release request message to an EPC when the UE determines that it currently connects with at least two PDNs, sending a disconnection request to the EPC when receiving a PDN release rejection message from the EPC with a rejection reason contained in the rejection message that the last PDN connection is not allowed to be released, and sending an attach request message to the EPC to set up a PDN connection with the EPC after receiving a disconnection acceptance message from the EPC; and the EPC, which is used for receiving the PDN release request message from the UE, sending the PDN release rejection message to the UE, wherein the rejection reason contained in the rejection message is that the last PDN connection is not allowed to be released, receiving a disconnection request from the UE and sending a disconnection acceptance message to the UE, and receiving the attach request message from the UE to set up the PDN connection with the UE.

The EPC is further used for receiving the PDN release request message, and sendinging the PDN release rejection message to the UE when determining that a PDN connection requested to be released contained in the PDN release request message is the only PDN connection set up between the EPC and the UE according to LBI information of the PDN connection requested to be released contained in the PDN release request message and PDN connection information between the EPC and the UE stored by the EPC.

The system may further include an eNB which is used for receiving an S1 interface release message from the EPC and sending an air interface release message to the UE to notify the UE to release the air interface between the UE and the eNB; and the EPC may be further used for sending the S1 interface release message to the eNB to notify the eNB to release the S1 interface between the eNB and the EPC.

The UE may be further used for sending an uplink message to the EPC via the eNB, performing connection reconfiguration, and sending context information of a default EPS bearer reception to the EPC via the eNB to set up the PDN connection with the EPC, wherein the uplink message contains a PDN connection set-up request;

the EPC is further used for receiving the uplink message and sending a bearer set-up request to the eNB, wherein the bearer set-up request contains context request information for setting up the default EPS bearer; and the eNB is further used for receiving the bearer set-up request from the EPC and sending an RRC connection reconfiguration message to the UE.

A device for processing the release failure of the PDN includes:

a sending and determining module which is used for sending a PDN release request message to the EPC when the sending and determining module determines that it currently connects with at least two PDNs, sending a disconnection request, and sending an attach request message; and a receiving and connecting module which is used for indicating the sending and determining module to send the disconnection request when receiving a PDN release rejection message from the EPC with a rejection reason contained in the rejection message that the last PDN connection is not allowed to be released, indicating the sending and determining module to send the attach request message to the EPC when receiving a disconnection acceptance message from the EPC, and setting up a PDN connection with the EPC according to the attach request message from the sending and determining module.

The receiving and connecting module is further used for receiving an air interface release message from the eNB, and releasing the air interface between the UE and the eNB according to the air interface release message.

The sending and determining module is further used for sending an uplink message to the EPC via the eNB, wherein the uplink message contains a PDN connection set-up request; and the receiving and connecting module is further used for receiving an RRC connection reconfiguration message from the eNB, performing connection reconfiguration, sending context information of the default EPS bearer reception to the EPC via the eNB, and setting up the PDN connection with the EPC.

The embodiments of the present disclosure provide a method, system and device for processing the release failure of a PDN. The method includes: a UE, when the UE determines that it currently connects with at least two PDNs, sends a PDN release request message to an EPC and receives a release rejection message from the EPC, wherein the rejection reason is that the last PDN connection is not allowed to be released; then the UE releases each PDN connection with EPC and resets up a PDN connection with the EPC to keeps the PDN connection information at the UE side consistent with that at the EPC side, so as to save resources and improve the reliability of data transmission.

DETAIL DESCRIPTION

In embodiments of the present disclosure, to avoid inconsistency between the PDN information stored by the EPC and that stored the UE, when an EPC sends a PDN release rejection message to a UE which initiates a PDN release request message because the rejection reason is that the PDN requested to be released is the only PDN connection between the UE and EPC, each PDN connection between the UE and the EPC is disconnected and a connection is reset up between the UE and EPC so as to make the PDN information of the UE and that of the EPC being consistent, effectively utilize resources and improve the reliability of data transmission.

The embodiments of the present disclosure are described below with reference to drawings in details.

Figure 1:
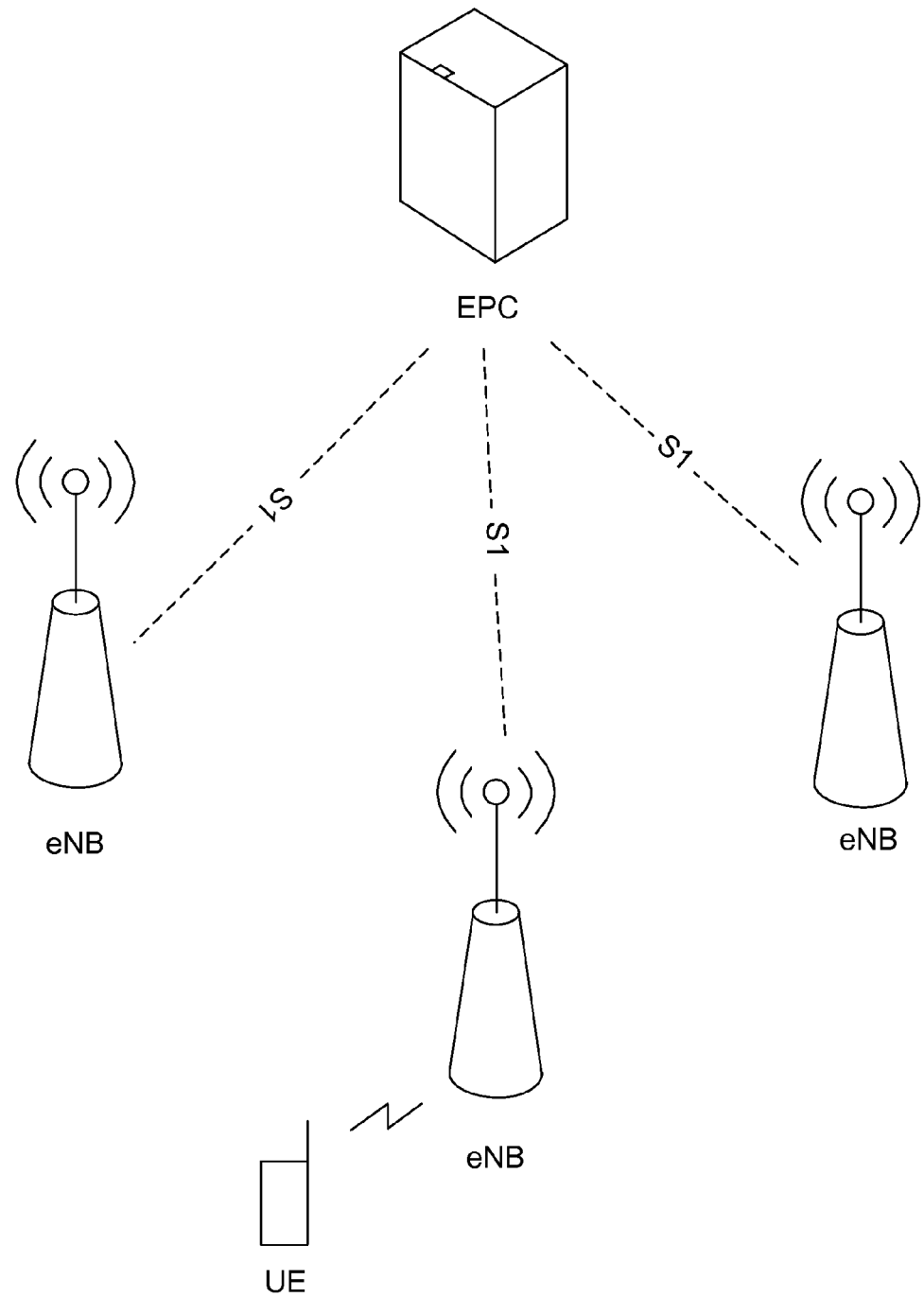
FIG. 1 is a diagram showing a structure of an LTE system in the prior art.
Figure 2:
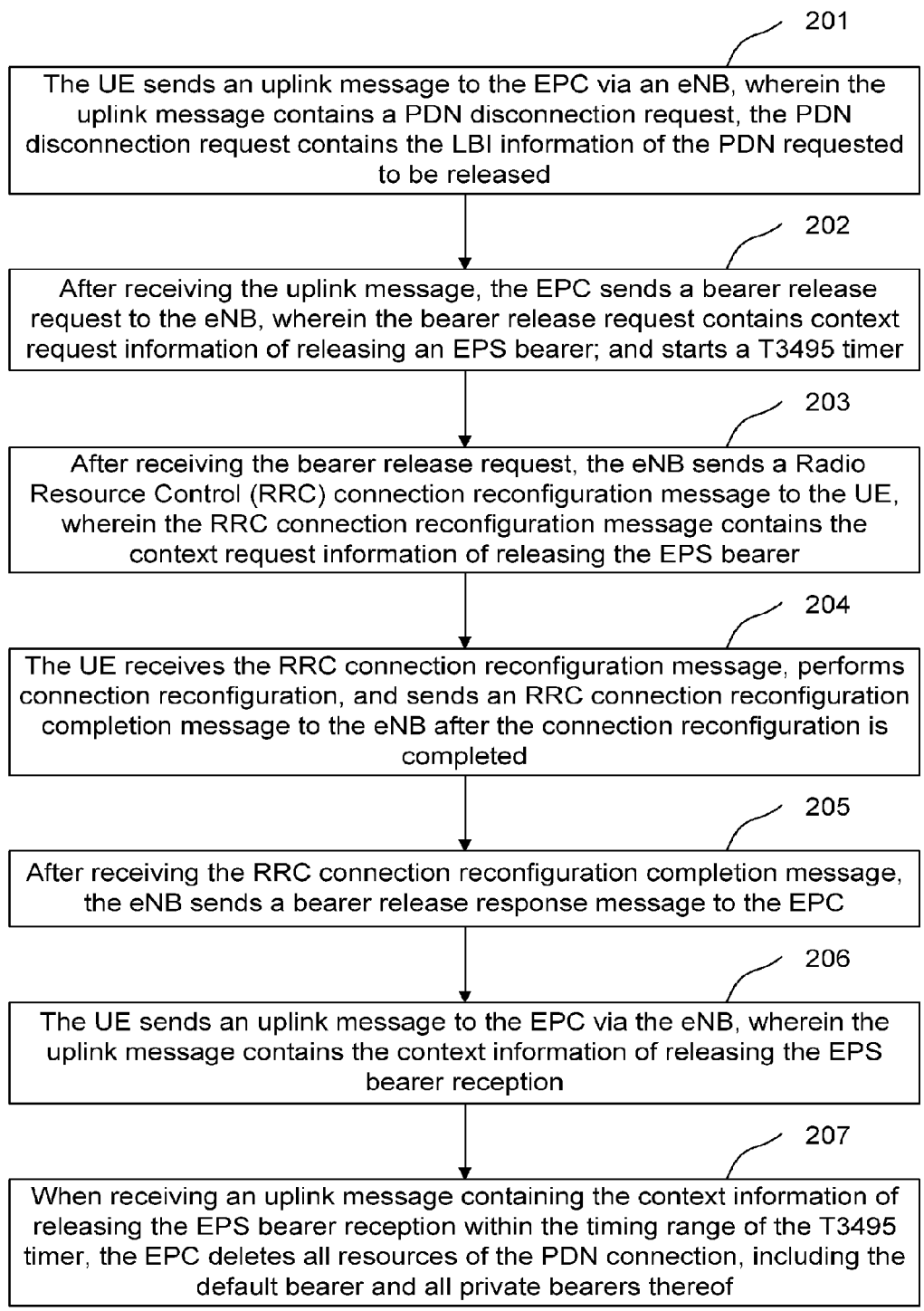
FIG. 2 is a process that a UE requests to release a certain PDN in the prior art.
Figure 3:
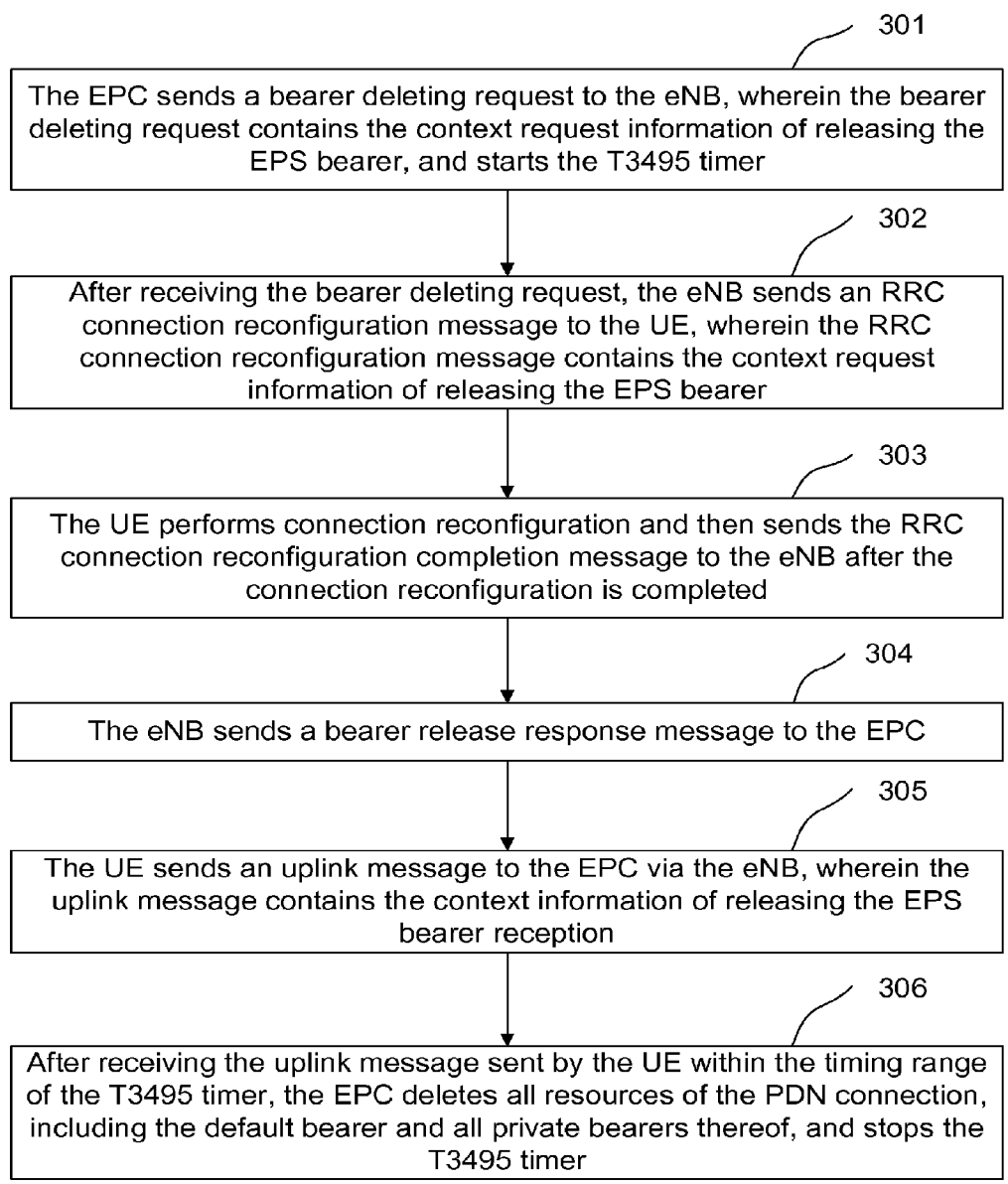
FIG. 3 is a process that an EPC actively initiates a PDN release request in a connected state in the prior art.
Figure 4:
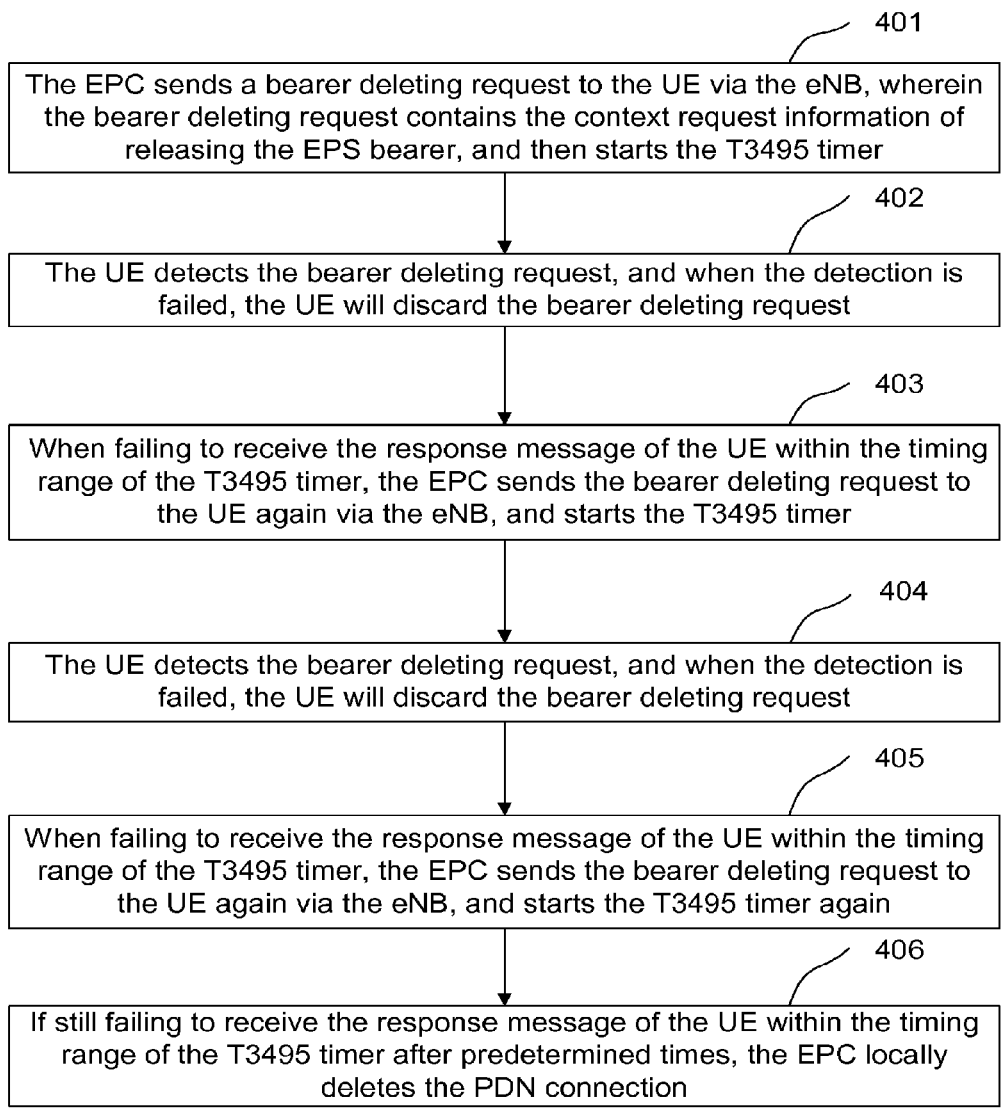
FIG. 4 is a process that an EPC cannot notify a UE due to a network status in the prior art.
Figure 5:
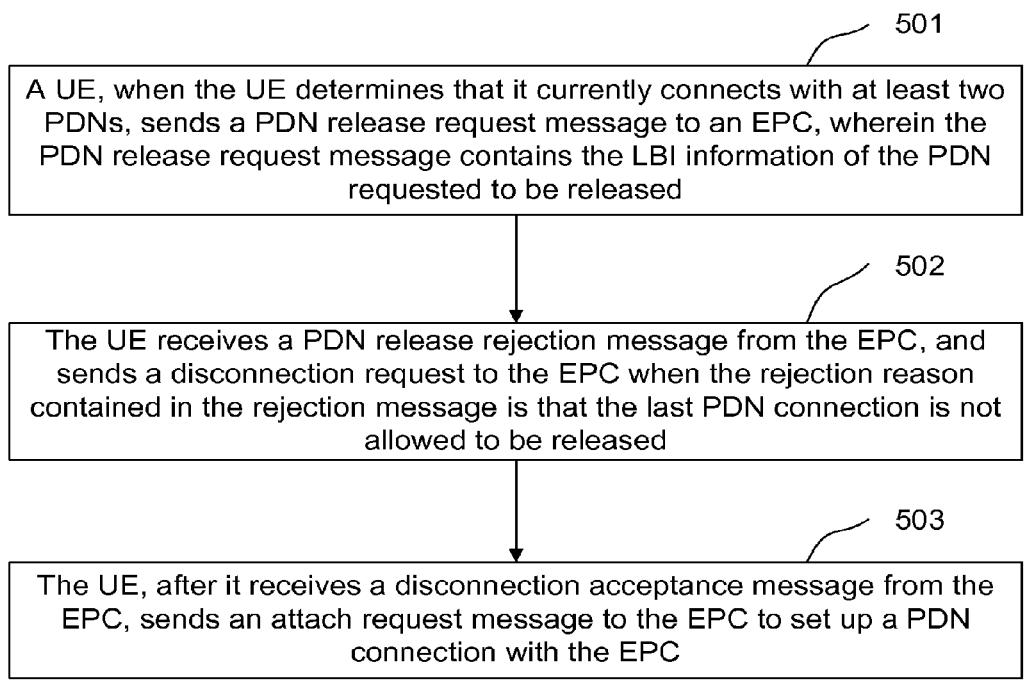
FIG. 5 is a process of processing the release failure of a PDN in an embodiment of the present disclosure.

FIG. 5 is a process of processing the release failure of a PDN in an embodiment of the present disclosure, and the process may include:

S501: A UE, when the UE determines that it currently connects with at least two PDNs, sends a PDN release request message to an EPC, wherein the PDN release request message contains the LBI information of the PDN requested to be released.

The UE determines that it currently connects with at least two PDNs, and sends a PDN release request message to the EPC in order to release a certain PDN connection. In addition, the PDN release request message contains the LBI information of the PDN requested to be released, so that the EPC can determine which PDN connection is released.

S502: The UE receives a PDN release rejection message from the EPC, and sends a disconnection request to the EPC when the rejection reason contained in the rejection message is that the last PDN connection is not allowed to be released.

After the EPC receives the release request message from the UE, which contains the LBI information of the PDN requested to be released, when the EPC determines that the PDN connection requested to be released is the only PDN connection with the UE according to the PDN connection information between the EPC and the UE and the LBI information of the PDN requested to be released contained in the PDN release request message, the EPC sends the PDN release rejection message to the UE;

furthermore, the rejection message carries the rejection reason that the last PDN connection is not allowed to be released.

When the UE has connection information of at least two PDNs, the UE determines that the PDN connection requested to be released is not the only connection with the EPC, which indicates that the PDN connection information stored by the UE is not consistent with that stored by the EPC. To make the PDN connection information stored by the UE and EPC consistent, the UE sends a disconnection request to the EPC to disconnect all PDN connections between the UE and EPC.

S503: The UE, after it receives a disconnection acceptance message from the EPC, sends an attach request message to the EPC to set up a PDN connection with the EPC.

Since the UE has the connection information of at least two PDNs and only deletes one of the PDN connections, it is indicated that the UE further needs to keep PDN connection with the EPC to perform data transmission via the PDN connection. Therefore, when the UE requests to release the PDN connection with the EPC, the UE further needs to send the attach request message to the EPC to set up the PDN connection with the EPC.

In the embodiment of the present disclosure, the UE determines that it currently connects with at least two PDNs, so that the UE can determine that the PDN connection information stored by itself and stored by the EPC are not consistent when receiving the PDN release rejection message from the EPC and determining that the rejection reason contained in the rejection message is that the last PDN connection is not allowed to be rejected, and then the UE releases the PDN resources by disconnecting all PDNs connected therewith. The UE connects with at least two PDNs before releasing a certain PDN, so that the UE further needs the PDN for data transmission and then resets up a PDN connection with the EPC by sending an attach request message to perform subsequent data transmission.

When at least two PDN connections are set up between the UE and the EPC, the UE distinguishes each PDN connection by the LBI. When the UE sends a PDN release request message to the EPC, the release request message contains the LBI information of the PDN requested to be released, so that the EPC can obtain which PDN connection is released by the UE.

Figure 6:
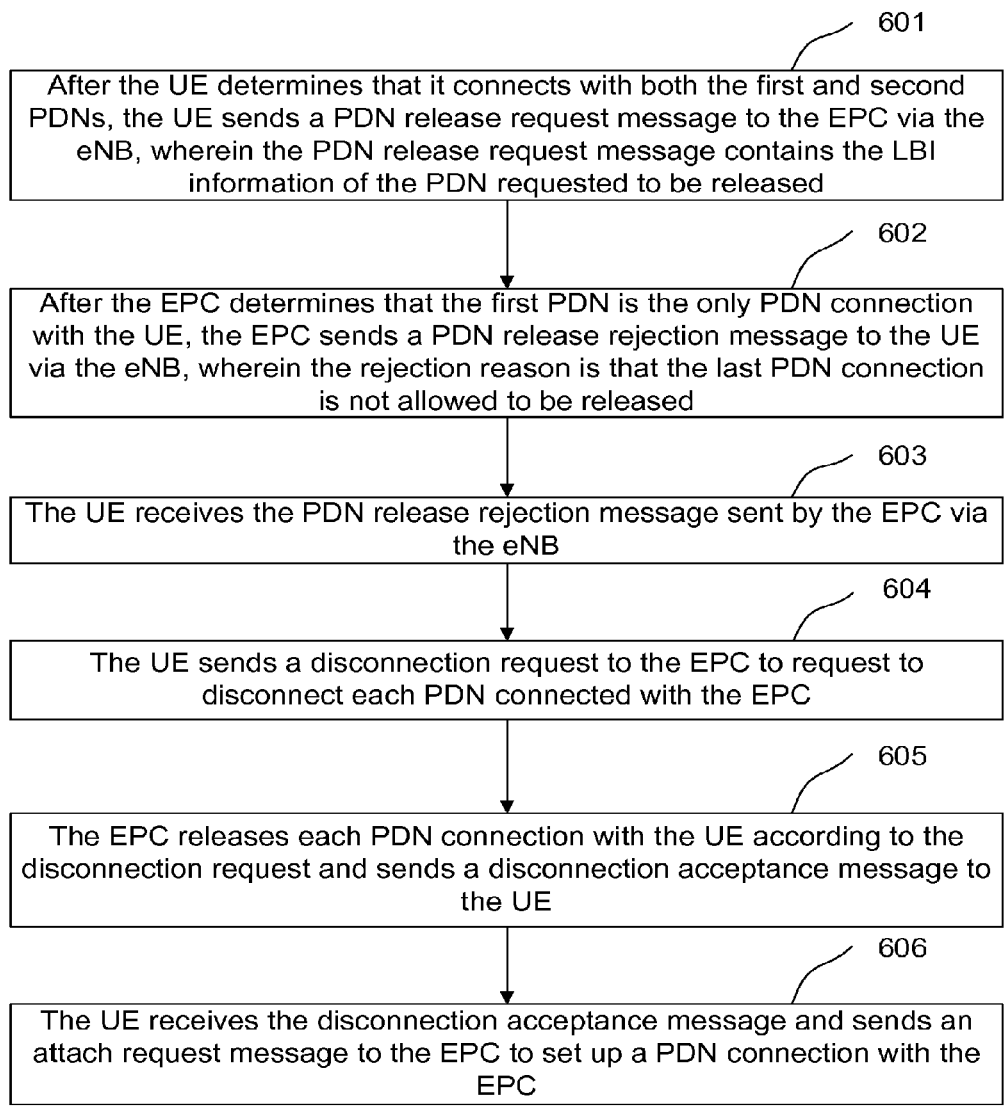
FIG. 6 is a process that a UE requests to release a first PDN connection in an embodiment of the present disclosure.

Due to the network status, or the conditions of the UE and EPC, the EPC does not send a notification message to the UE when releasing a certain PDN connection, so that the PDN connection information of the UE and that of EPC are not consistent. Furthermore, when there is only one PDN connection between the EPC and the UE, for example, the only PDN connection between the EPC and the UE is first PDN connection, the UE determines that it connects with both the first and second PDNs. FIG. 6 is a process that a UE requests to release the first PDN connection in an embodiment of the present disclosure, and the process includes the following steps:

S601: When determining that it connects with both the first and second PDNs, the UE sends a PDN release request message to the EPC via the eNB, wherein the PDN release request message contains the LBI information of the PDN requested to be released, i.e., the LBI information of the first PDN.

S602: After the EPC receives the PDN release request message, the EPC sends a PDN release rejection message to the UE via the eNB when it determines that the first PDN is the only PDN connection with the UE according to the LBI information of the first PDN and the PDN connection information between the EPC and the UE stored by the EPC, wherein the rejection reason contained in the rejection message is that the last PDN connection is not allowed to be released.

That is, the EPC determines that there is only one PDN connection between itself and the UE currently according to the PDN connection information stored in the EPC and the LBI information of the PDN requested to be released in the PDN release request message, so that the PDN connection is not allowed to be released.

S603: The UE receives the PDN release rejection message sent by the EPC via the eNB.

S604: The UE sends a disconnection request to the EPC to request to disconnect each PDN connected with the EPC.

S605: The EPC releases each PDN connection with the UE according to the disconnection request and sends a disconnection acceptance message to the UE.

S606: The UE receives the disconnection acceptance message and sends an attach request message to the EPC to set up a PDN connection with the EPC.

When the UE receives the PDN release rejection message sent by the EPC, wherein the rejection reason contained in the release rejection message is that the last PDN connection is not allowed to be released, because the UE currently connects with at least two PDNs, i.e., the PDN connection requested to be released is not the only connection with the EPC, the UE sends a disconnection request to the EPC and releases each PDN connection with the EPC.

Figure 7:
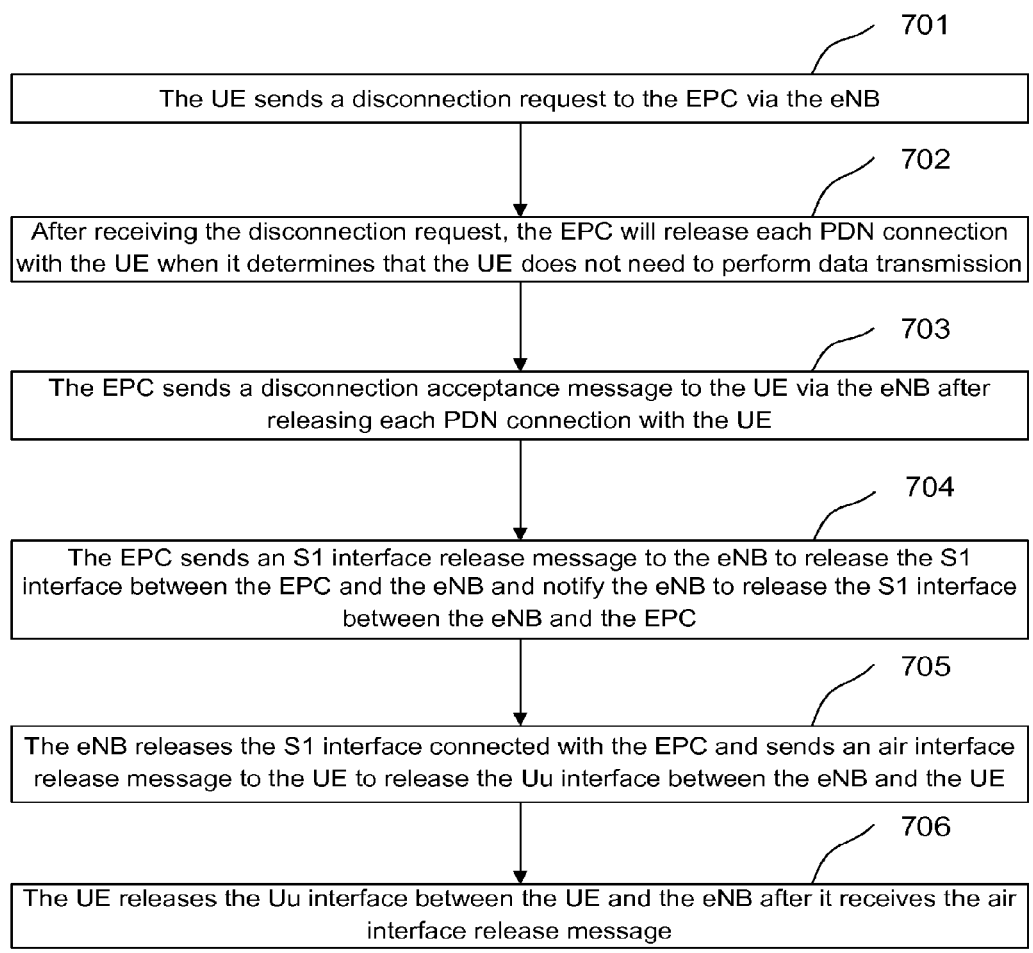
FIG. 7 is a process that a UE sends a disconnection request to an EPC to release each PDN connection in an embodiment of the present disclosure.

FIG. 7 is a process that a UE sends a disconnection request to an EPC to release each PDN connection in an embodiment of the present disclosure, and the process includes the following steps:

S701: The UE sends a disconnection request to the EPC via the eNB.

S702: After receiving the disconnection request, the EPC will release each PDN connection with the UE when it determines that the UE does not need to perform data transmission.

S703: The EPC sends a disconnection acceptance message to the UE via the eNB after releasing each PDN connection with the UE.

S704: The EPC sends an S1 interface release message to the eNB to release the S1 interface between the EPC and the eNB and notify the eNB to release the S1 interface between the eNB and the EPC.

S705: The eNB, after receiving the S1 interface release message, releases the S1 interface connected with the EPC and sends an air interface release message to the UE to release the Uu interface between the eNB and the UE.

S706: The UE releases the Uu interface between the UE and the eNB after it receives the air interface release message.

In the embodiment of the present disclosure, if the PDN connection information of the UE and that of the EPC are not consistent due to network status or conditions of the UE and EPC while the UE determines that it currently connects with at least two PDNs but receives the PDN release rejection message from the EPC, wherein the rejection reason contained in the release rejection message is that the last PDN connection is not allowed to be released, in order to keep the PDN connection information of the UE and that of the EPC being consistent, reduce the waste of resources and ensure the high reliability of data transmission, the UE sends a disconnection request to the EPC and keeps its PDN connection information being consistent with that of the EPC by releasing each PDN connection with the EPC, in the embodiment of the present disclosure.

At the same time, the UE has determined that it currently connects with at least two PDNs and only needs to release one of the PDN connections, so, it is known that the UE further needs to keep at least one PDN connection with the EPC for the subsequent data transmission. In the embodiment of the present disclosure, furthermore, in order to ensure the consistence of the PDN connection information of the UE and that of the EPC and ensure that the UE can further perform subsequent data transmission, the UE sends an attach request message to the EPC to reset up a PDN connection with the EPC.

Figure 8:
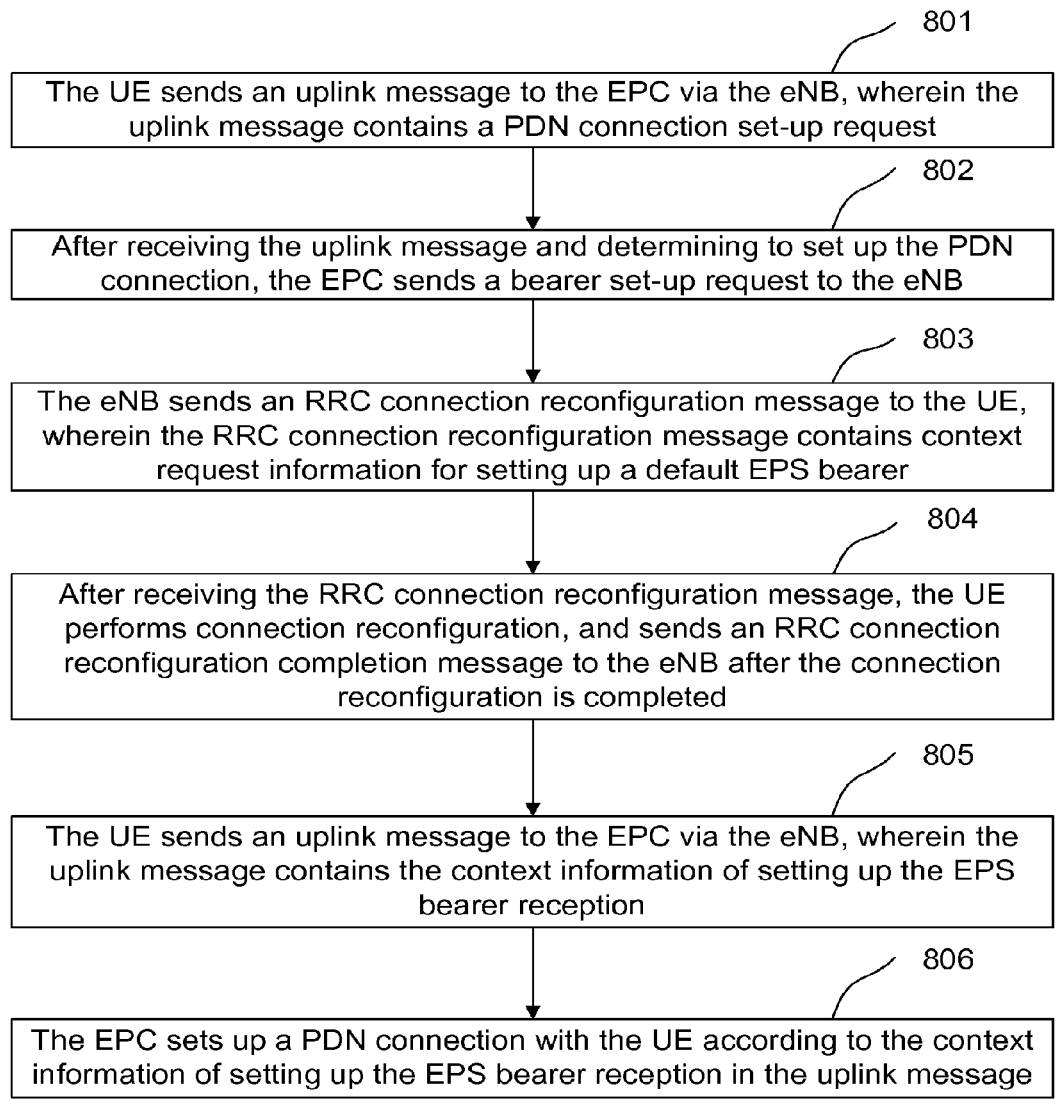
FIG. 8 is a process that a UE sets up a PDN connection with an EPC in an embodiment of the present disclosure.

FIG. 8 is a process that a UE sets up a PDN connection with an EPC in an embodiment of the present disclosure, and the process includes the following steps:

S801: The UE sends an uplink message to the EPC via the eNB, wherein the uplink message contains a PDN connection set-up request.

S802: After receiving the uplink message and determining to set up the PDN connection, the EPC sends a bearer set-up request to the eNB, wherein the bearer set-up request contains context request information for setting up a default EPS bearer.

S803: After receiving the bearer set-up request, the eNB sends an RRC connection reconfiguration message to the UE, wherein the RRC connection reconfiguration message contains context request information for setting up a default EPS bearer.

S804: After receiving the RRC connection reconfiguration message, the UE performs connection reconfiguration, and sends an RRC connection reconfiguration completion message to the eNB after the connection reconfiguration is completed.

S805: The UE sends an uplink message to the EPC via the eNB, wherein the uplink message contains the context information of setting up the EPS bearer receptioin.

S806: After receiving the uplink message, the EPC sets up a PDN connection with the UE according to the context information of setting up the EPS bearer reception in the uplink message.

The UE firstly disconnects the PDN connection with the EPC, and re-sets up a PDN connection with the EPC to keep its PDN connection information being consistent with that of the EPC, so that the non-release of partial PDN resources cannot result in waste of resources. In addition, due to the set-up of the PDN connection and the consistence of the PDN connection information, the reliability of data transmission is improved.

In addition, the UE may also connects with more than three or four PDNs before releasing a certain PDN connection, but the EPC only records one PDN connection between the EPC and the UE, thus, when the UE disconnects each PDN connection with the EPC, it can re-set up a PDN connection with the EPC according to its own requirement, i.e., either one or more than one PDN connections can be set up. The process of setting up each PDN connection is the same as that in the above mentioned embodiments, thereby any description is omitted here.

Figure 9:
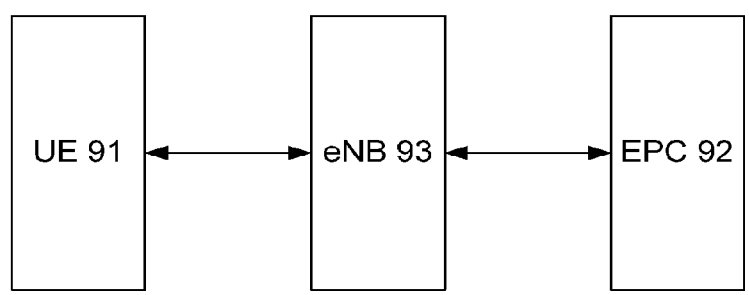
FIG. 9 is a diagram showing the structure of a system for processing the release failure of a PDN in an embodiment of the present disclosure.

FIG. 9 is a diagram showing a structure of a system for processing the release failure of a PDN in an embodiment of the present disclosure, and the system includes:

a UE 91, which is used for sending a PDN release request message to an EPC 92 when the UE 91 determines that it currently connects with at least two PDNs, sending a disconnection request to the EPC 92 when the UE 91 receives a PDN release rejection message sent by the EPC 92, and sending an attach request message to the EPC 92 and setting up a PDN connection with the EPC 92 after receiving a disconnection acceptance message from the EPC 92, wherein the rejection reason contained in the rejection message is that the last PDN connection is not allowed to be released; and the EPC 92, which is used for receiving the PDN release request message from the UE 91, sending the PDN release rejection message to the UE 91, receiving a disconnection request from the UE 91 and sending a disconnection acceptance message to the UE 91, receiving the attach request message from the UE 91, and setting up a PDN connection with the UE 91, wherein the rejection reason contained in the rejection message is that the last PDN connection is not allowed to be released.

In the system, the EPC 92 is further used for, after receiving a PDN release request message, sending a PDN release rejection message to the UE 91 when it determines that the PDN requested to be released is the only PDN connection with the UE 91 according to the LBI information of the PDN requested to be released and the PDN connection information between the EPC and the UE stored by the EPC.

The system further includes an eNB 93, which is used for receiving the S1 interface release message sent by the EPC 92 and sending an air interface release message to the UE 91 to notify the UE 91 to release the air interface between the UE 91 and the eNB 93; and the EPC 92 is further used for sending an S1 interface release message to the eNB 93 to notify the eNB 93 to release the S1 interface between the eNB 93 and the EPC 92.

In the system, the UE 91 is further used for sending an uplink message to the EPC 92 via the eNB 93, wherein the uplink message contains a PDN connection set-up request, performing connection reconfiguration, sending the context information of the default EPS bearer reception to the EPC 92 via the eNB 93, and setting up a PDN connection with the EPC 92; and the EPC 92 is further used for sending a bearer set-up request to the eNB 93 after the EPC 92 receives the uplink message, wherein the bearer set-up request contains context request information for setting up a default EPS bearer.

The eNB 93 is further used for receiving the bearer set-up request from the EPC 92 and sending an RRC connection reconfiguration message to the UE 91.

Figure 10:
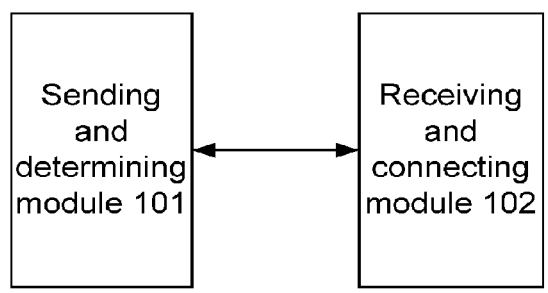
FIG. 10 is a diagram showing the structure of a device for processing the release failure of a PDN in an embodiment of the present disclosure.

FIG. 10 is a diagram showing a structure of a device for processing the release failure of a PDN in an embodiment of the present disclosure, and the device includes:

a sending and determining module 101 which is used for sending a PDN release request message to the EPC when the sending and determining module 101 determines that it currently connects with at least two PDNs, sending a disconnection request, and sending an attach request message; and a receiving and connecting module 102 which is used for indicating the sending and determining module 101 to send the disconnection request when the receiving and connecting module 102 receives a PDN release rejection message from the EPC with the rejection reason contained in the rejection message that the last PDN connection is not allowed to be released, indicating the sending and determining module 101 to send an attach request message to the EPC when receiving a disconnection acceptance message from the EPC, and setting up a PDN connection with the EPC according to the attach request message from the sending and determining module 101.

The receiving and connecting module 102 is further used for receiving an air interface release message from the eNB, and releasing the air interface between the receiving and connecting module 102 and the eNB according to the air interface release message.

In the device, the sending and determining module 101 is further used for sending an uplink message to the EPC via the eNB, wherein the uplink message contains a PDN connection set-up request; and the receiving and connecting module 102 is further used for receiving an RRC connection reconfiguration message from the eNB, performing connection reconfiguration, sending the context information of the default EPS bearer reception to the EPC via the eNB, and setting up the PDN connection with the EPC.

The embodiments of the present disclosure provide a method, system and device for processing release failure of a PDN. The method includes: a UE, when the UE determines that it currently connects with at least two PDNs, sends a PDN release request message to an EPC and receives a release rejection message from the EPC with a rejection reason that the last PDN connection is not allowed to be released; and the UE releases each PDN connection with the EPC and then resets up a PDN connection with the EPC to keep consistency between the PDN connection information of the UE and that of the EPC, so as to save resources and improve the reliability of data transmission.

Obviously, any modifications and variations for the present present disclosure can be made by those skilled in the art within the spirit and scope of the present disclosure. In this way, if such modifications and variations are in the scope of the claims and its equivalents, the present disclosure is intended to cover such modifications and variations.

The invention claimed is:

1. A method for processing release failure of a Packet Data Network (PDN), comprising:
    sending, by a UE, a PDN release request message to an Evolved Packet Core (EPC), when the UE determines that it currently connects with at least two PDNs;
    sending, by the UE, a disconnection request to the EPC, when the UE receives a PDN release rejection message sent by the EPC with a rejection reason contained in the rejection message that a last PDN connection is not allowed to be released; and
    sending, by the UE, after receiving a disconnection acceptance message sent by the EPC, an attach request message to the EPC to set up a PDN connection with the EPC.

2. The method according to claim 1, wherein the EPC sends, after receiving the PDN release request message, the PDN release rejection message to the UE when determining that a PDN connection requested to be released contained in the PDN release request message is the only PDN connection set up between the EPC and the UE according to Linked EPS Bearer Id (LBI) information of the PDN connection requested to be released contained in the PDN release request message and PDN connection information between the EPC and the UE stored by the EPC.

3. The method according to claim 1, further comprising: after the EPC sends the disconnection acceptance message,
    sending, by the EPC, an S1 interface release message to an eNB to notify the eNB to release the S1 interface between the eNB and the EPC; and
    sending, by the eNB, an air interface release message to the UE, after the eNB receives the S1 interface release message, to notify the UE to release the air interface between the UE and the eNB.

4. The method according to claim 1, wherein setting-up the PDN connection with the EPC comprises:
    sending, by the UE, an uplink message, which contains a PDN connection set-up request, to the EPC via an eNB;
    sending, by the EPC, a bearer set-up request to the eNB after receiving the uplink message, wherein the bearer set-up request contains context request information for setting up a default EPS bearer;
    receiving, by the eNB, the bearer set-up request, and sending an RRC connection reconfiguration message to the UE; and
    performing, by the UE, connection reconfiguration, and sending context information of the default EPS bearer reception to the EPC via the eNB to set up the PDN connection with the EPC.

5. A system for processing release failure of a PDN, comprising:
    a UE, configured to send a PDN release request message to an EPC when the UE determines that it currently connects with at least two PDNs, send a disconnection request to the EPC when receiving a PDN release rejection message from the EPC with a rejection reason contained in the rejection message that a last PDN connection is not allowed to be released, and send an attach request message to the EPC to set up a PDN connection with the EPC after receiving a disconnection acceptance message from the EPC; and
    the EPC, configured to receive the PDN release request message from the UE, send the PDN release rejection message to the UE, wherein the rejection reason contained in the rejection message is that the last PDN connection is not allowed to be released, receive the disconnection request from the UE and send the disconnection acceptance message to the UE, and receive the attach request message from the UE to set up the PDN connection with the UE.

6. The system according to claim 5, wherein
    the EPC is configured to, after receiving the PDN release request message, send the PDN release rejection message to the UE when determining that a PDN connection requested to be released contained in the PDN release request message is the only PDN connection set up between the EPC and the UE according to LBI information of the PDN connection requested to be released contained in the PDN release request message and PDN connection information between the EPC and the UE stored by the EPC.

7. The system according to claim 5, further comprising an eNB which is configured to receive an S1 interface release message from the EPC and send an air interface release message to the UE to notify the UE to release the air interface between the UE and the eNB; and
    the EPC is further configured to send the S1 interface release message to the eNB to notify the eNB to release the S1 interface between the eNB and the EPC.

8. The system according to claim 7, wherein
    the UE is further configured to send an uplink message, which contains a PDN connection set-up request, to the EPC via an eNB to perform connection reconfiguration and send context information of a default EPS bearer reception to the EPC via the eNB to set up the PDN connection with the EPC;
    the EPC is further configured to receive the uplink message and send a bearer set-up request, which contains context request information for setting up the default EPS bearer, to the eNB; and
    the eNB is further configured to receive the bearer set-up request from the EPC and send an RRC connection reconfiguration message to the UE.

9. A device for processing release failure of a PDN, comprising:
    a sending and determining module, configured to send a PDN release request message to an EPC when the sending and determing module determines that it currently connects with at least two PDNs, send a disconnection request, and send an attach request message; and
    a receiving and connecting module, configured to indicate the sending and determining module to send the disconnection request when receiving a PDN release rejection message from the EPC with a rejection reason contained in the rejection message that a last PDN connection is not allowed to be released, indicate the sending and determining module to send the attach request message to the EPC when receiving a disconnection acceptance message from the EPC, and set up a PDN connection with the EPC according to the attach request message from the sending and determining module.

10. The device according to claim 9, wherein the receiving and connecting module is further configured to receive an air interface release message from an eNB, and release the air interface between the UE and the eNB according to the air interface release message.

11. The device according to claim 9, wherein
    the sending and determining module is further configured to send an uplink message, which contains a PDN connection set-up request, to the EPC via an eNB; and the receiving and connecting module is further configured to receive an RRC connection reconfiguration message from the eNB, perform connection reconfiguration, send context information of a default EPS bearer reception to the EPC via the eNB, and set up the PDN connection with the EPC.

* * * * *